(No Model.)  2 Sheets—Sheet 1.

A. J. SHAW.
ELECTRIC ELEVATOR BRAKE.

No. 515,255. Patented Feb. 20, 1894.

(No Model.)

A. J. SHAW.
ELECTRIC ELEVATOR BRAKE.

No. 515,255. Patented Feb. 20, 1894.

2 Sheets—Sheet 2.

Witnesses
Inventor:
Alton J. Shaw,
by Dodge Sons,
Attorneys.

UNITED STATES PATENT OFFICE.

ALTON J. SHAW, OF MUSKEGON, MICHIGAN.

ELECTRIC ELEVATOR-BRAKE.

SPECIFICATION forming part of Letters Patent No. 515,255, dated February 20, 1894.

Application filed October 24, 1893. Serial No. 489,008. (No model.)

*To all whom it may concern:*

Be it known that I, ALTON J. SHAW, a citizen of the United States, residing at Muskegon, in the county of Muskegon and State of Michigan, have invented certain new and useful Improvements in Hoisting Machinery, of which the following is a specification.

My invention relates to brakes for use in connection with hoisting machinery, railway cars and vehicles, and other apparatus driven by electro-motors.

The purpose of the invention is so to control the load that whether it be opposed to or acting with the motor, it shall be prevented from suddenly descending; that when descending, whether light or heavy, it shall move at a regulated speed; and that when the motor is at rest the load shall be held stationary.
To this end the invention consists broadly in the combination with electrically propelled machinery, of an electric brake in circuit with the motor, and adapted to withdraw the brake entirely while the propelled machinery moves in one direction, and partially but not wholly to withdraw it when said machinery moves in the reverse direction.

It further consists in a novel arrangement of apparatus whereby the brake is made self-regulating in its action.

Figure 1:
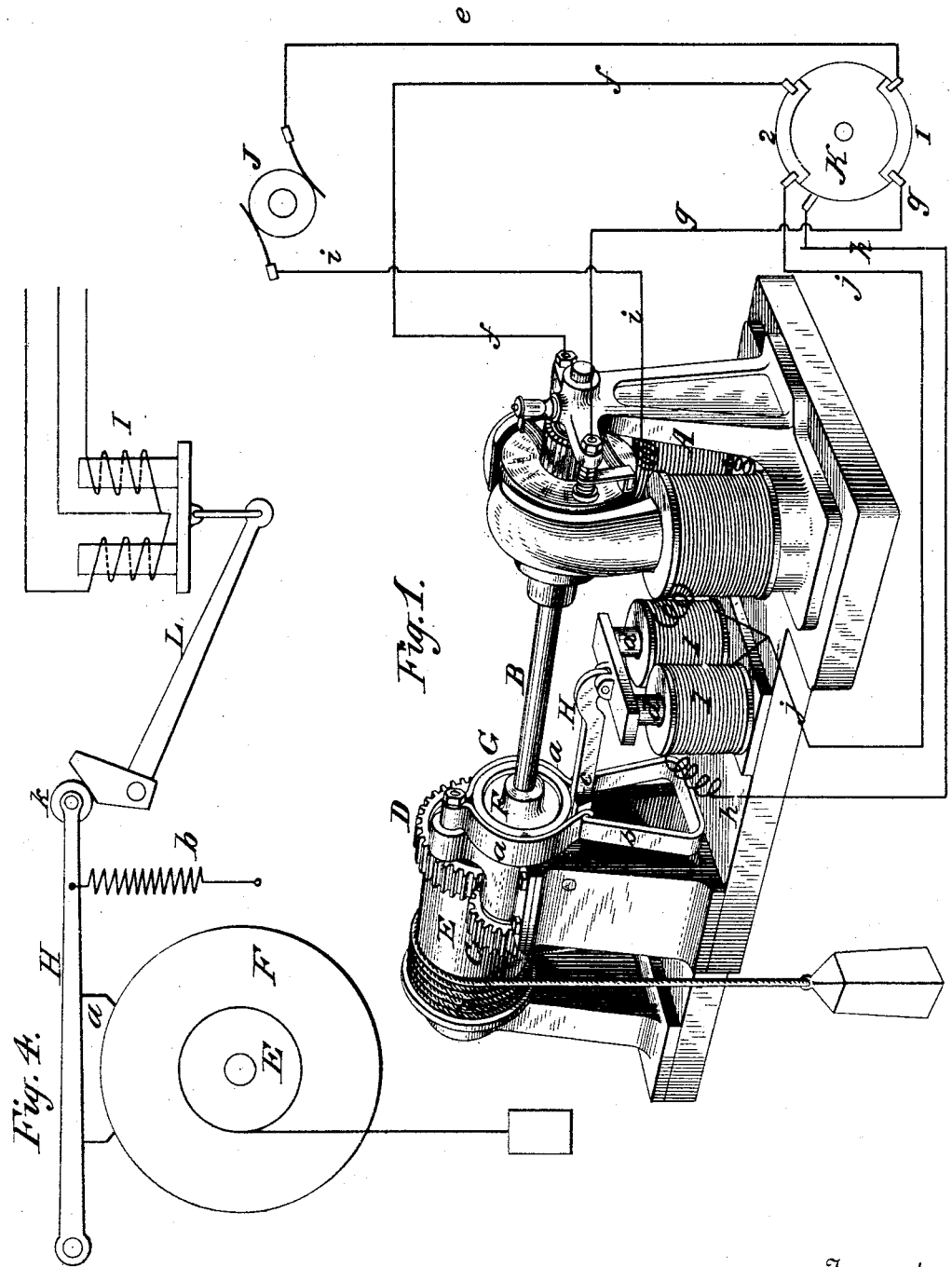
Figure 2:
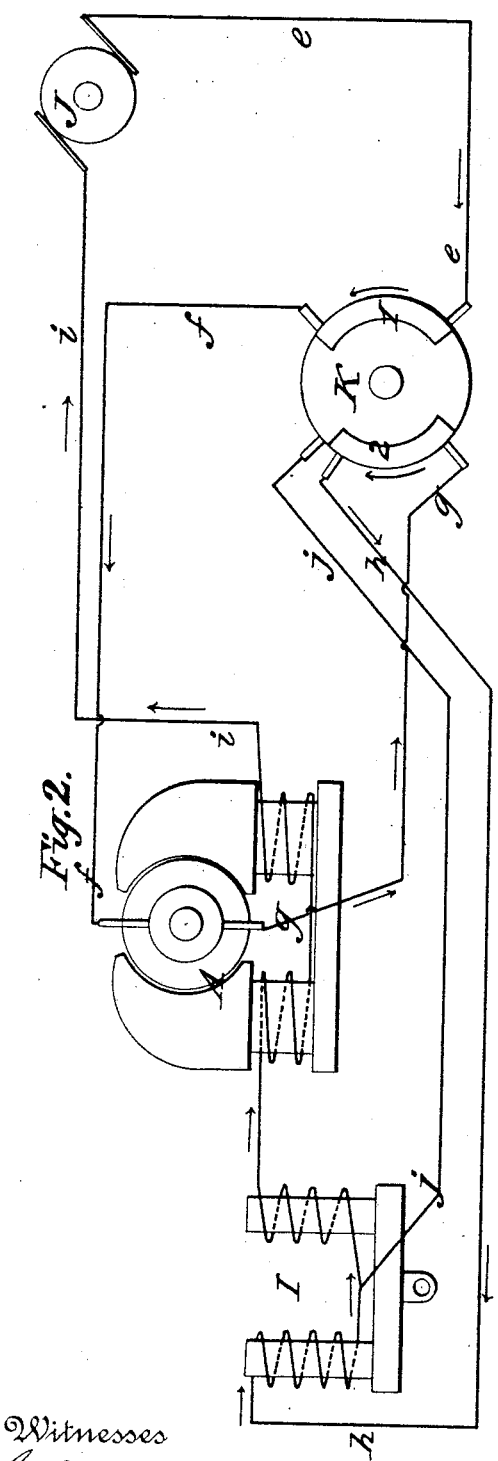
Figure 3:
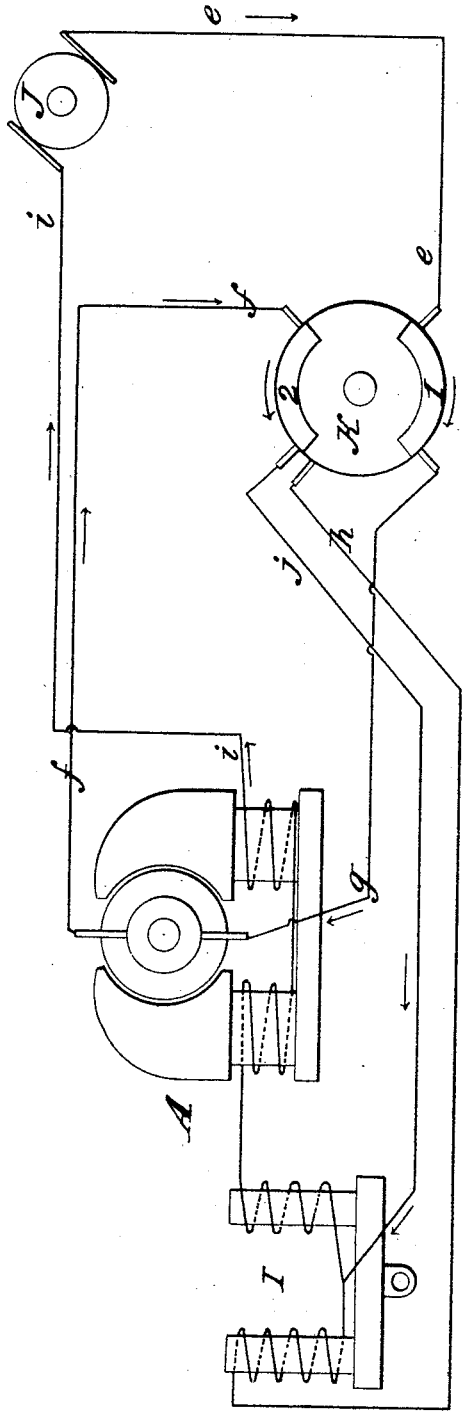

In the drawings,—Figure 1 is a perspective view illustrating the practical application of my invention to a simple form of hoisting machinery. Figs. 2 and 3 are diagrams illustrating the arrangement of the circuits and connections involved in carrying out the invention; and Fig. 4, a diagram illustrating the action of the brake in a slightly different form, and on a larger scale than in Fig. 1.
In the use of reversible electric motors for propelling vehicles and operating hoisting machinery, the load acts in opposition to the motor in ascending, and with it in descending. In the absence of a proper brake or holding device, the load is liable to descend rapidly when the motor turns in the lowering direction, or if the motor circuit be broken; hence it is customary to employ retarding or holding devices of one or another sort. In some cases the counter electro-motive force developed by the over-speeding of the motor is relied upon to check the descent of the load, but this is objectionable for the reason that it does not always act with sufficient promptness, since the acceleration becomes unduly great before the retarding action begins, and there is consequently no proper control at moderate speeds; while in the event of interruption of the circuit the load is relieved of all control.

To meet all contingencies, I have heretofore employed two brakes, one mechanical and the other electrical, as set forth in Letters Patent No. 452,619, dated May 19, 1891.

My present invention renders the mechanical brake unnecessary, though both may be used in some cases, or when desired.

As above stated, the invention consists broadly, in the combination with an electric motor and the machinery driven thereby, of a brake, the pressure of which shall, during movement of the machinery in one direction, be automatically and completely withdrawn from the part on which it acts, and the pressure of which shall, during reverse movement of the machinery, be partially but not entirely withdrawn.

The invention is susceptible of application or embodiment in various ways, some of which will be made the subject of separate applications; but in this application I intend to claim and cover the generic invention, and also specifically to claim one embodiment thereof, which is taken as a type or an illustration of the general plan.

Referring now to Fig. 1 of the drawings, A indicates an electro-motor, the shaft B of which carries a pinion C, gearing with and giving motion to a wheel D secured upon a hoisting drum E, or upon the shaft thereof. The motor is of that type in which the field current is of constant direction and the armature current is reversible, so as to enable the operator readily to reverse the motor when necessary.

F indicates a disk or hub formed or secured upon the shaft B, (or it may be upon any connected part of the apparatus,) upon which disk the brake is arranged to act.

The form or character of the brake is not essential, though I prefer one of the general character represented in Fig. 1 or in Fig. 4, that is to say, one in which the brake band or shoe is lifted off the hub or disk by a wedge or cam carried by a lever.

In Fig. 1 I have represented the style of brake set forth in my Patent No. 452,619, above noted, and in the subsequent Patent No. 461,052, for an improvement on the same. This brake G comprises two suspended shoes $a$, $a$, which, when the motor is at rest, are forced against the periphery of the hub or disk F by a powerful spring $b$, acting upon their free or movable ends.

During the operation of the motor A, the brake is withdrawn in whole or in part, through the action of a lever H, having a wedge-shaped portion $c$, which enters between the lower ends of the shoes $a$, $a$, and forces them apart, the lever H being drawn down by the action of an electro-magnet I, included in the field circuit of the motor. The electro-magnet is advisably made in the form of a double solenoid, or two hollow coils, into which the cores $d\ d$, are drawn so long as a current passes through the coils.

It will readily be understood from the foregoing that so long as the motor is in action or its circuit is closed, the pressure of the brake will be diminished or relieved in some degree, the extent of such diminution depending upon the force or attracting power of the magnet I; but that as soon as the current is interrupted, the spring $b$ will force the shoes $a$, $a$, against the hub or disk and break the apparatus.

In order to cause the brake to act differentially, that is, wholly to release the mechanism while the load is ascending, and partially to release it when the load is descending, I provide a special arrangement of reversing switch and circuits shown in Figs. 2 and 3.

Referring first to Fig. 2, which shows the adjustment for hoisting, it will be seen that the current from the generator J, or any source of electric energy indicated thereby, passes by a conductor $e$ to conducting strip 1 of a reversing switch K, thence by a conductor $f$ to the upper commutator brush of motor A, through the armature to the lower brush, thence by conductor $g$ to contact strip 2 of the reversing switch K, thence by conductor $h$ to the coils of magnet I which it traverses in series, thence to the field coils of the motor A, and finally, by conductor $i$ back to the generator or source of energy J. It will be seen that as the current passes through the full winding of the magnet, said magnet will be energized to the full extent of such current, and the brake will therefore be completely withdrawn, leaving the motor free to act without hinderance in lifting the load. If now, the reversing switch be set as shown in Fig. 3, which represents the adjustment for lowering, it will be seen that while the direction of the current in the field remains the same, it is reversed in the armature; and further, that the current will pass through but one of the magnet coils, and consequently will not so strongly energize the magnet.

Referring to Fig. 3, the current will be seen to proceed from the generator or other source of energy J, by conductor $e$, to conducting strip 1 of the switch K, thence by conductor $g$ to the lower brush of the commutator, through the armature to the upper brush, thence by conductor $f$ to conducting strip 2 of the switch K, thence by conductor $j$ to the magnet I, with the winding of which it connects at a point between the two coils, thence through one coil of the magnet to the field coils of the motor A, and finally by conductor $i$ back to the generator or other source of electric energy J. The point at which conductor $j$ joins the magnet coils may be varied to make any desired degree of difference in the energization and strength of the magnet between the ascending and descending adjustments.

Fig. 4 represents the brake as consisting of a shoe $a$, carried by a lever H, which lever is furnished at one end with an antifriction roller $k$. A lever L, having a cam-like portion near its pivot or fulcrum, serves, when moved, to raise or lower lever H and to lift the brake shoe from or permit a spring $b$, or its equivalent, a weight, to set the shoe against the disk. The circuits, connections and switch will be the same with this as with the construction above described.

It will be understood of course that if the motor circuit be wholly interrupted, the brake will be applied with full force, and will hold the load at whatever point it may occupy at the instant of such interruption. This interruption may be effected by bringing a non-conducting portion of the reversing switch beneath or in contact with the terminal of conductor $e$, or by an independent switch.

The strength of current will be regulated by a rheostat or in any usual way. The form and style of motor, generator, switch, brake, &c., are immaterial, provided only the principle of variable brake power be retained substantially as above explained.

The terms "ascending" and "descending" are employed to indicate more readily the purpose and occasion of the variation in the brake-magnet power and consequent brake-pressure, but it is to be understood that the idea is broadly to cause the magnet to act with greater power when the propelled machinery is moving in one direction than when it is moving in the other direction. This I mean to claim, whether the direction of rotation of the motor be simultaneously reversed or otherwise, though I contemplate such reversal ordinarily.

The apparatus thus described is perfectly automatic and steady in action, perfect regulation resulting from the regulation existing between the motor, the brake and the brake-magnet, as will readily be understood from the following explanation: The tendency toward acceleration in the speed at which the load descends, is dependent upon two factors, the weight of the load, and the power applied to or through the armature, both of which tend to lower the load. This tendency toward acceleration is resisted by the pressure of the brake, subject to or controlled by, the solenoid or brake-magnet. As the speed increases, the increased counter-electromotive force of the armature thereby set up causes a decrease of current flowing through the circuit. This decrease of current partially de-energizes or weakens the solenoid, which weakening permits the brake to exert a greater pressure upon the brake drum, which greater pressure tends to retard the descent of the load and decrease the speed of the motor. This decrease of speed lessens the counter electro-motive force, and the above stated train of action takes place in the reverse order. In practice these tendencies exist to operate practically simultaneously, and always balance one another, so that the descent of the load will take place at a regular and constant speed; hence the apparatus is self-regulating.

Having thus described my invention, what I claim is—

1. In combination with an electric motor, a brake, an electro-magnet for controlling said brake; means for reversing said motor, and means for causing the current to exercise a greater energizing influence upon the brake-magnet in proportion to the current strength, when the motor is turning in one direction than when turning in the other.

2. In combination with an electro-motor, a brake, an electro-magnet for controlling said brake, and a switch adapted to direct the current through a greater number of the brake-controlling-magnet coils when the motor is running in one direction than when running in the other direction.

3. In combination with an electro-motor and with mechanism propelled thereby, a brake for controlling said mechanism, an electro-magnet for controlling said brake, and means for varying the strength of the brake-controlling magnet in accordance with the direction of movement of the driven mechanism and independently of the strength of current delivered to the motor.

4. In combination with a source of electric energy as J, an electromotor A, a shaft B driven thereby and provided with a hub or disk F, a brake shoe or band adapted to press upon said disk, a lever H for withdrawing the brake, and electro-magnet I for actuating said lever, a reversing switch for the motor, and conductors connecting the source of energy, the switch, the magnet and the motor, substantially as set forth; whereby the adjustment of the switch to cause the motor to turn in one direction causes the current to pass through the entire winding of the electro-magnet, and adjustment of the switch to cause the motor to turn in the reverse direction causes the current to pass through only a portion of the magnet winding.

5. In combination with an electro-motor, a brake, an electro-magnet for controlling the brake, and means whereby reversal of the motor is caused to vary the strength of the brake-controlling magnet independently of the strength of current delivered to the motor.

6. The herein described method of controlling electrically propelled machinery employed for hoisting and like work and provided with a brake and with an electro-magnet for controlling the brake, which consists in causing the current to pass through a relatively large number of the brake-magnet coils while the load is ascending or opposed to the motor, and through a relatively small number of said coils while the load is descending, or acting with the motor.

7. The herein-described method of controlling the descent of loads in electric hoisting machinery, which consists in reducing the energization of the brake retracting magnet relatively to the energization of the motor, when the load is to be lowered, whereby the brake is permitted to exercise greater control over the motor when the load is descending than when it is ascending.

In witness whereof I hereunto set my hand in the presence of two witnesses.

ALTON J. SHAW.

Witnesses:
J. G. EMERY, Jr.,
T. C. AKIN.